United States Patent
Raman et al.

(10) Patent No.: US 9,455,994 B1
(45) Date of Patent: Sep. 27, 2016

(54) TECHNIQUES FOR INTELLIGENTLY EXECUTING A DIGITAL SIGNATURE

(71) Applicant: Symantec Corporation, Mountain View, CA (US)

(72) Inventors: Nivedhitha Raman, Santa Monica, CA (US); Everett J. Lai, Monterey, CA (US)

(73) Assignee: Symantec Corporation, Mountain View, CA (US)

( * ) Notice: Subject to any disclaimer, the term of this patent is extended or adjusted under 35 U.S.C. 154(b) by 49 days.

(21) Appl. No.: 14/473,301

(22) Filed: Aug. 29, 2014

(51) Int. Cl.
*G06F 21/00* (2013.01)
*H04L 29/06* (2006.01)

(52) U.S. Cl.
CPC ........... *H04L 63/1408* (2013.01); *H04L 63/08* (2013.01)

(58) Field of Classification Search
CPC combination set(s) only.
See application file for complete search history.

(56) References Cited

U.S. PATENT DOCUMENTS 8,566,932 B1 * 10/2013 Hotta .................. G06F 11/00
726/2

* cited by examiner

*Primary Examiner* — Ghazal Shehni
(74) *Attorney, Agent, or Firm* — Wilmer Cutler Pickering Hale and Dorr LLP

(57) ABSTRACT

Techniques for intelligently executing a digital signature are disclosed. In one embodiment, the techniques may be realized as a method for intelligently executing a digital signature. The method may include receiving a signature request from a user, wherein the signature request comprises a file. The method may also include performing a signature process on the file in response to receiving the signature request from the user. The method may further include scanning the signature request to generate one or more scan results, and transmitting an indication of the one or more scan results to a reputation service server.

20 Claims, 5 Drawing Sheets

TECHNIQUES FOR INTELLIGENTLY EXECUTING A DIGITAL SIGNATURE

FIELD OF THE DISCLOSURE

The present disclosure relates generally to digitally signing files and, more particularly, to techniques for intelligently executing a digital signature.

BACKGROUND OF THE DISCLOSURE

A wide variety of malicious software (i.e., malware) can attack modern computers. Malware threats include computer viruses, worms, Trojan horse programs, spyware, adware, crimeware, and phishing websites. Malicious entities sometimes attack servers that store sensitive or confidential data that can be used to the malicious entity's own advantage. Similarly, other computers, including home computers, must be constantly protected from malicious software that can be transmitted when a user communicates with others via electronic mail, when a user downloads new programs or program updates, and in many other situations. The different options and methods available to malicious entities for attack on a computer are numerous.

Conventional techniques for detecting malware, such as signature string scanning, are becoming less effective. Modern malware is often targeted and delivered to only a relative handful of computers. For example, a Trojan horse program can be designed to target computers in a particular department of a particular enterprise. Such malware might never be encountered by security analysts, and thus the security software might never be configured with signatures for detecting such malware. Mass-distributed malware, in turn, can contain polymorphisms that make every instance of the malware unique. As a result, it is difficult to develop signature strings that reliably detect all instances of the malware.

Further, attackers often camouflage malware by making the malware appear to be legitimate. Security software often implicitly trusts digitally-signed software. The signature identifies the entity that created the software and proves that the file containing the software has not been modified since signing. Therefore, the security software assumes that signed software does not contain malware and gives the software a low level of scrutiny. Attackers can obtain signing certificates through fraud or theft and use the certificates to sign files containing malware, thereby defeating the security software.

Newer techniques for detecting malware involve the use of reputation systems. A reputation system can determine the reputation of a file or other object encountered on a computer in order to assess the likelihood that the object is malware. One way to develop the reputation for an object is to collect reports from networked computers on which the object is found and base the reputation on information within the reports. However, in a system in which reports are collected from networked computers on which the object is found, there is a lag period between when a file is first released and when that file has been reported to the reputation system. In addition, the use of a compromised certificate to sign files may not be detected until after digitally signed files are already in circulation, leading to a lag period before the certificate can be revoked.

In view of the foregoing, it may be understood that there may be significant problems and shortcomings associated with current digital signing and reputation system technologies.

SUMMARY OF THE DISCLOSURE

Techniques for intelligently executing a digital signature are disclosed. In one embodiment, the techniques may be realized as a method for intelligently executing a digital signature comprising receiving a signature request from a user, wherein the signature request comprises a file. The method further comprises scanning the signature request to produce one or more scan results. In addition, the method comprises performing a signature process on the file in response to receiving the signature request from the user. The method also comprises communicating an indication of the one or more scan results to a reputation service server.

In another embodiment, the techniques may be realized as a system for intelligently executing a digital signature. The system comprises one or more processors communicatively coupled to a network. The one or more processors are configured to receive a signature request from a user, wherein the signature request comprises a file. The one or more processors are also configured to scan the signature request to produce one or more scan results. The one or more processors are further configured to perform a signature process on the file in response to receiving the signature request from the user. In addition, the one or more processors are configured to communicate an indication of the one or more scan results to a reputation service server.

In a further embodiment, the techniques may be realized as a non-transitory computer readable storage medium containing computer program instructions for intelligently executing a digital signature. In this embodiment, the instructions comprise instructions for receiving a signature request from a user, wherein the signature request comprises a file. The instructions further comprise instructions for scanning the signature request to produce one or more scan results. The instructions also comprise instruction for performing a signature process on the file in response to receiving the signature request from the user. In addition, the instructions comprise instructions for providing an indication of the one or more scan results to a reputation service server. In addition, the time at which the file was signed may be communicated to a reputation service server.

In some embodiments, the one or more scan results comprise information related to the user. In some embodiments, the information related to the user may comprise any or all of the IP address of a machine from which the signature request was made, a MAC address of the machine from which the signature request was made, an OS type of the machine from which the signature request was made, a timestamp of a time at which the signature request was made, an indication of one or more applications installed on the machine from which the signature request was made, a historical reputation of one or more other files previously signed by the user, a historical reputation of one or more other files previously signed by a certificate associated with the signature request, the number of certificates in a plurality of certificates associated with the user, an indication of any of the previously listed information, or an indication of information related to the plurality of certificates associated with the user.

In some embodiments, the one or more scan results comprise information related to the file. In some embodiments, the information related to the file may comprise any or all of file size, the signature of the file, a hash of the file, a file type, a file name, a file modification timestamp, a file creation timestamp, file permissions, source path, an indication of any of the previous information, or other information regarding file structure or content.

In some embodiments, scanning the file may comprise examining the contents of the file. Examining the contents of the file may further comprise one or more of emulating the execution of the file, performing a deobfuscation transformation on the file, performing a static string analysis of the file, performing a statistical analysis of one or more properties of the file, comparing the file and a previously signed file, and examining the contents of a difference between the file and a known good file.

In some embodiments, performing a signature process may comprise contacting the user via a secondary communications channel. Performing the signature process may further comprise transmitting a signature verification request to the user and receiving a signature verification confirmation from the user. In addition, performing the signature process may comprise signing the file after the user verifies the signature request. In some embodiments, performing a signature process further comprises determining whether to sign the file based on the one or more scan results. In at least some embodiments, the determination may be based on a comparison of the one or more scan results to one or more approval thresholds.

In some embodiments, the indication of the one or more scan results may comprise a file confidence metric. In some embodiments, the indication of the one or more scan results may comprise a determination that the file is not malicious.

In some embodiments, performing a signature process may comprise determining if a certificate associated with the signature request has been compromised. In addition, performing a signature process may further comprise rejecting the signature request if the certificate has been compromised. In some embodiments, performing a signature process also comprises notifying an owner of the certificate that the certificate has been compromised.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

The present disclosure relates to improving the security and utility of signature processes by allowing the signature process to use scanning data to detect issues in the signing process and to inform a reputation system of file status during the signing process.

Figure 1:
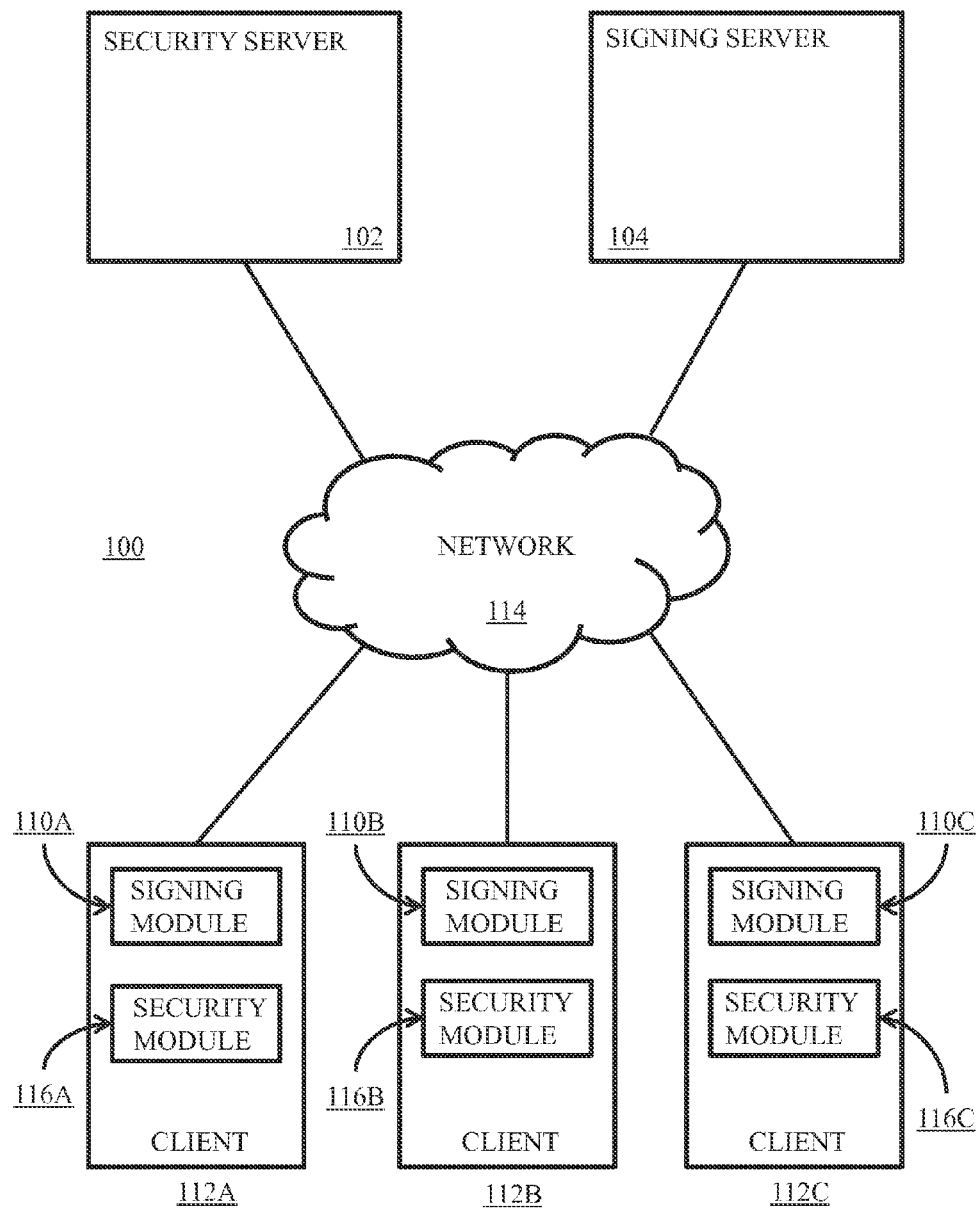
FIG. 1 shows a block diagram of a network environment in accordance with one embodiment of the present disclosure.

FIG. 1 is a block diagram of a network environment 100 according to one embodiment. FIG. 1 illustrates a security server 102 connected to a network 114. Also illustrated is a signing server 104 connected to the network 114. The network 114 is also connected to multiple clients 112. Embodiments of the computing environment 100 can have thousands or millions of clients 112, as well as multiple servers 102, 104. In some embodiments, the clients 112 (comprising client 112a, client 112b, and client 112c) are only connected to the network 114 for a certain period of time or not at all.

The signing server 104 and the security server 102 interact with the clients 112. One or more of the functions of the signing server 104 and the security server 102 can also be executed in a cloud computing environment. For example, the system may be implemented such that the signing server 104 is a cloud server which the clients 112 access in order to digitally sign files. Signing server 104, while described as a single server, may incorporate server functionality spread across multiple physical server computers. As used herein, cloud computing refers to a style of computing in which dynamically scalable and often virtualized resources are provided as a service over the Internet.

The client 112 is used by a user to interact with the signing server 104 and/or other entities on the network 120. In one embodiment, the client 112 is a personal computer (PC) such as a desktop or notebook computer. In other embodiments, the client 112 is a mobile telephone, personal digital assistant, or other electronic device. For purposes of this description, the term "client" also includes computers such as servers and gateways that encounter software applications or other entities that might constitute malware or other threats. For example, a client 112 can be a network gateway located between an enterprise network and the Internet.

The client executes a signing module 110 that allows the client to request that a file be signed. The signing module 110 creates a signing request, which may include a file, and transmits it to the signing server 104. The client 112 may also execute a security module 116 that provides security to the client 112 by detecting and remediating malware and performing other security-related tasks. The security module 116 detects files at the client 112 and provides identifiers of the files to the security server 102.

In addition, the security module 116 determines whether files at the client contain malware. In one embodiment, if the security module 116 encounters a file with a valid digital signature, the security module 116 provides an identifier of the signed file, and associated signing information describing the digital signature, to the security server 102. In response, the security module 116 receives from the security server 102 trust data indicating a level of trust to give the signed file. The security module 116 uses the trust data to determine whether the signed file contains malware. In some embodiments, the security server 102 receives data indicative of a level of trust for a signed file from signing server 104. In some embodiments, security server 102 is a reputation service server.

Figure 2:
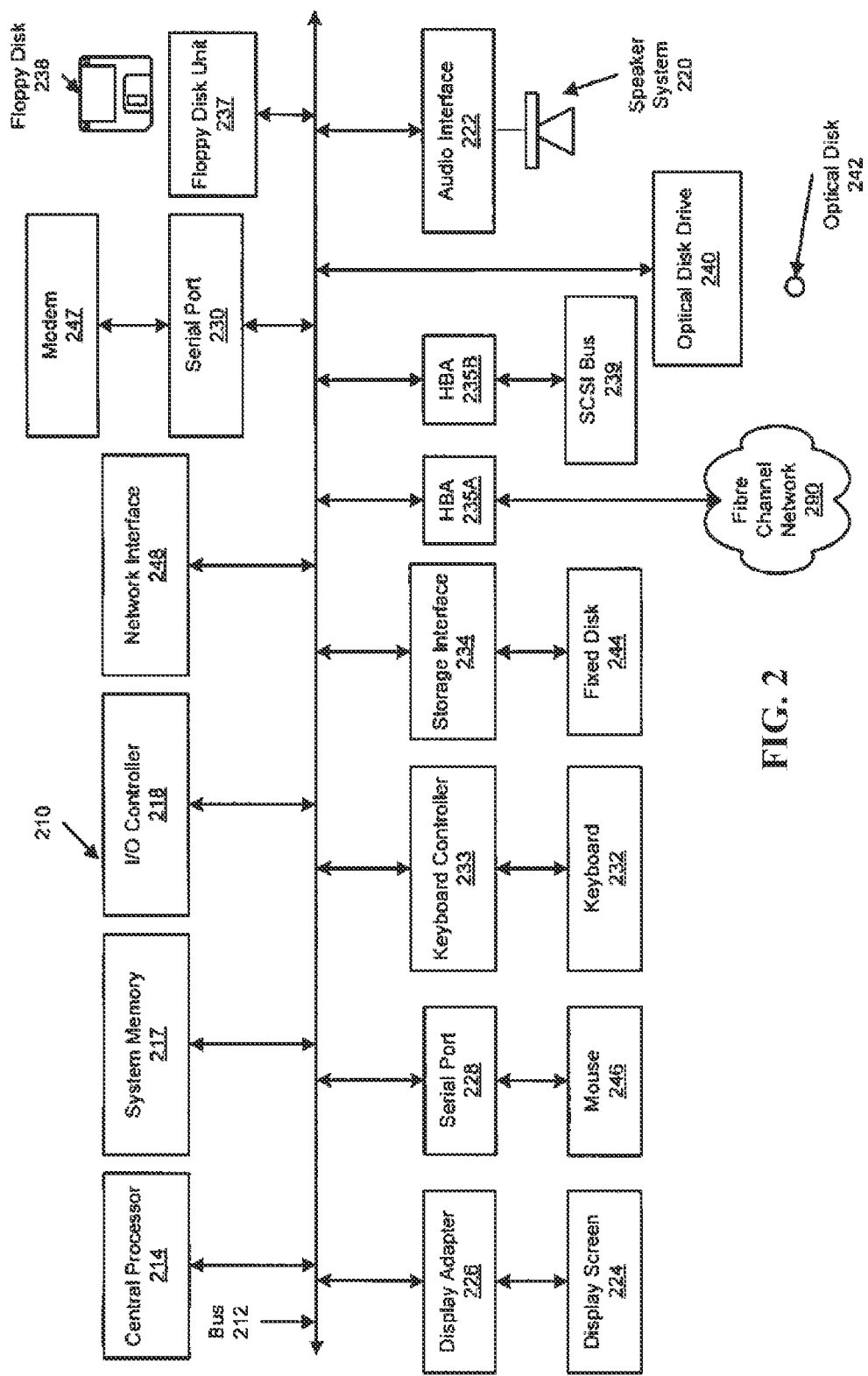
FIG. 2 shows a block diagram of a computer system in accordance with one embodiment of the present disclosure.

FIG. 2 depicts a block diagram of an computer system 210 suitable for implementing an apparatus and method for reclamation of physical memory blocks in the presence of a COW snapshot or other image or data object that is dependent on data reclamation. Computer system 210 may be illustrative of various computer systems (e.g., a server) shown in FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

The operation of a computer system such as that shown in FIG. 2 is readily known in the art and is not discussed in detail in this application. Code for implementing the present disclosure can be stored in computer-readable storage media such as one or more of system memory 217, fixed disk 244, optical disk 242, or floppy disk 238. Memory 220 is also used for storing temporary variables or other intermediate information during the execution of instructions by the processor 210. The operating system provided on computer system 210 may be MS-DOS®, MS-WINDOWS®, OS/2®, UNIX®, Linux®, or another known operating system.

Figure 3:
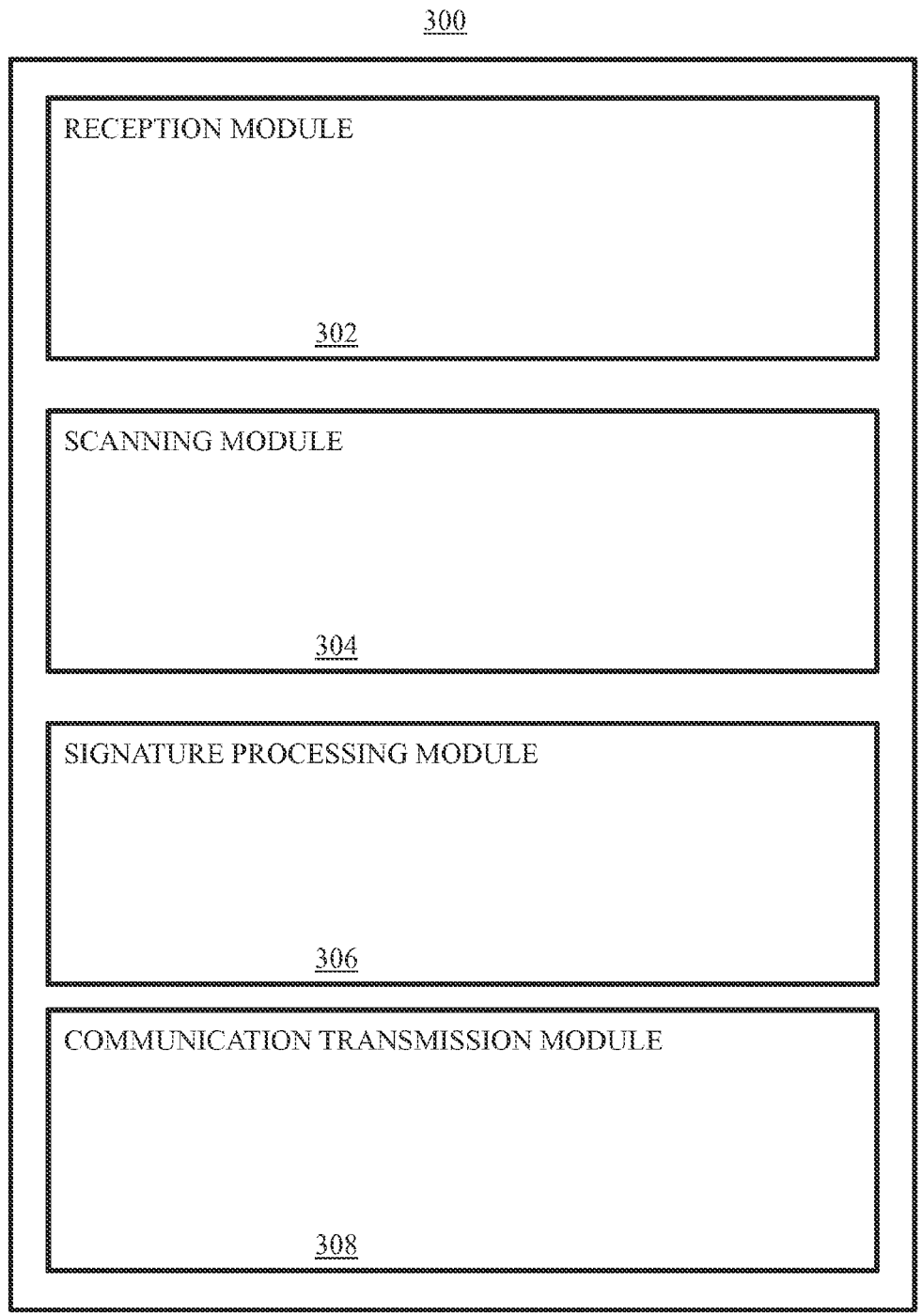
FIG. 3 shows a block diagram of modules used in receiving signature requests, scanning signature requests, and performing a signing process according to one embodiment.

FIG. 3 depicts a block diagram of an embodiment of a system 300 for intelligently executing a digital signature. In one embodiment, system 300 may be used as the signing server 104 of FIG. 1. In various embodiments, system 300 may include a reception module 302, a scanning module 304, a signature processing module 306, and a communication transmission module 308.

For example, in some embodiments, reception module 302 may be configured to receive a signature request from a user. In some embodiments, this request may be received on an external non-transitory storage medium received from a user, received via a network such as network 114 of FIG. 1, or from a file stored on system 300. In some embodiments, reception module 302 may also be configured to extract a file from a received signature request.

In some embodiments, scanning module 304 may be configured to scan the signature request to produce one or more scan results. In certain embodiments, scanning module 304 may incorporate submodules configured to analyze the contents of a file or the context of a file. The submodules may analyze a file by emulating the execution of the file, performing a deobfuscation transformation on the file, performing a static string analysis of the file, performing a statistical analysis of one or more properties of the file, or performing any of these types of analysis on the difference between the file and a known good file.

In some embodiments, signature processing module 306 may be configured to perform a signature process on the file in response to receiving the signature request from the user. In certain embodiments, performing a signature process may include determining whether to sign the file based on the one or more scan results.

In some embodiments, communication transmission module 308 may be configured to communicate an indication of the one or more scan results to a reputation service server. In one embodiment, communication transmission module 308 may communicate an indication of the one or more scan results to the security server 102 of FIG. 1.

Figure 4:
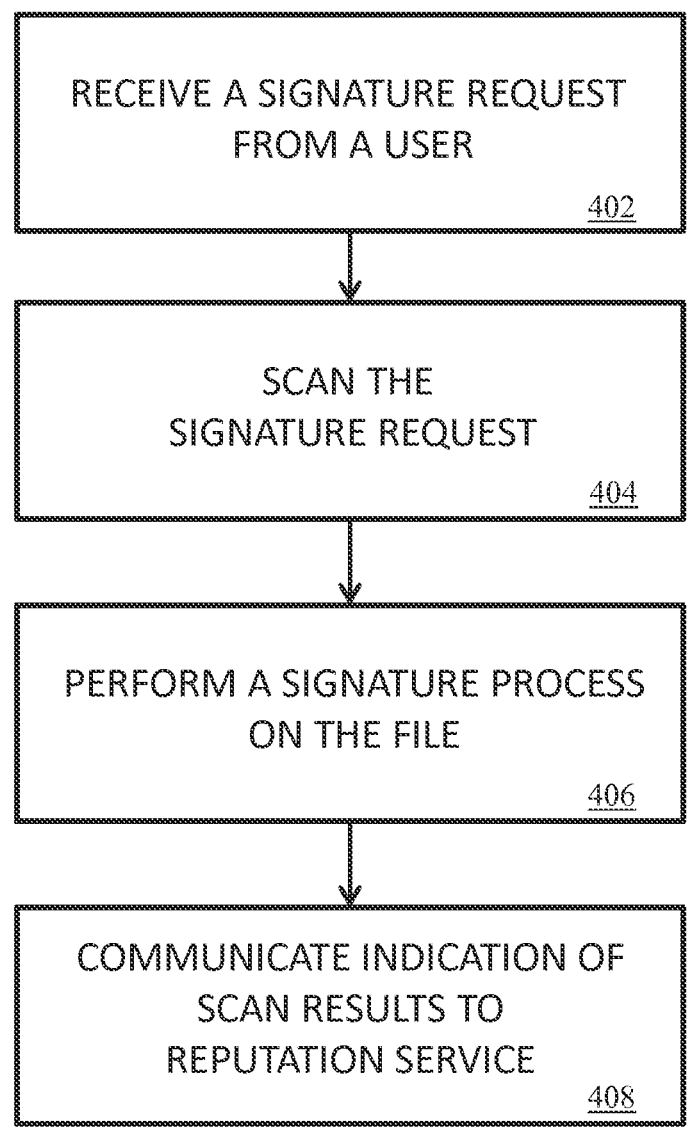
FIG. 4 is a flowchart illustrating the operation of a method for intelligently executing a digital signature in accordance with an embodiment of the present disclosure.

FIG. 4 is a flowchart depicting one embodiment implementing a method of intelligently executing a digital signature. The steps shown in FIG. 4 may be performed by any suitable computer-executable code and/or computing system or systems. In some embodiments, the steps shown in FIG. 4 may be performed by one or more of the components of security server 102 or signing server 104 in FIG. 1, system 200 in FIG. 2, or system 300 in FIG. 3.

As illustrated in FIG. 4, at step 402 the systems described herein may receive a signature request. The signature request may be received from a user such as a software developer responsible for generating or creating software applications, a content provider responsible for generating or creating digital content, a software or content distributor responsible for distributing or publishing applications or content created by others, or the like. The signature request may be generated prior to the release of the file to the market or to the general public, allowing malware detection to be more effective by providing detection of malware from before the release date of the applications or content. The signature request may be generated by a client module such as signing module 110 in FIG. 1. The client module may be a browser or browser module. The signature request may include a file to be signed. The signature request may also include other information such as a user identifier, a certificate for use in signing, a security token identifying a certificate for use in signing, access information to grant access to a certificate for use in signing, the time the request was made, and/or other information used to control access to a signing certificate or verify access to a signing certificate. The signature request may further include other data about the user or client device, including the MAC address of the client device used by the user, the OS type of the client, the make and model of the client, information about applications installed on the client, and/or similar system fingerprinting information.

In addition, information may be observed by the receiving system in the course of receiving a signature request. Such information may include the name of the ISP used by the user, the IP address of the client device, the location of the client device, and the time at which the signature request was received. During the process of receiving a signature request, the system may also retrieve information about the client. Such information may include historical data regarding the reputation of files to be signed, historical data regarding the reputation of other files signed by a certificate identified for use in signing the file, or historical data regarding other certificates associated with the certificate. Such information may be retrieved from local storage or from a certificate cloud server.

At step 404, the systems described herein may scan the signature request and thereby generate one or more scan results. Scanning the signature request may be performed in a variety of ways. For example, the contents of the signature request or of the file to be signed may be examined. The contents of the file may include the machine code, object code, or source code of the file. In addition, the context of the signature request or of the file to be signed may be examined. The context of the file may include metadata of the file or historical data regarding the file. It may also include information regarding the user or client device from which the signature request was received, such as historical data regarding the certificates used by the client device, historical data regarding certificates associated with the user, network location information, geolocation information of the client device, and historical location or geolocation regarding client devices previously associated with the file or with the certificate to be used to sign the file.

Examining these contents and contexts may also be performed in a variety of ways. For example, in one embodiment, the file may be loaded into an emulation environment and emulated. The outcome of executing the file can then be observed. An emulation environment may include a virtual machine, a software emulator, or a hardware emulator. Based on the results of the emulation, scan results may be generated representing the emulation results. In another embodiment, static string analysis is performed on the signature request or the file. In static string analysis, the signature request or the file is examined for static strings, such as strings that are known or believe to be incorporated into various forms of malware. In yet another embodiment, one or more properties of the signature request or the file are subjected to statistical analysis. For example, a high proportion of a certain property may indicate a malicious file, or a frequency of occurrence of another property that is within a normal range for that property may indicate a file unlikely to be malicious. These techniques for scanning a signature request may also be combined with one another; for example, emulation results may be generated and static string analysis may also be performed. Conventional methods for scanning a file may also be employed.

In various embodiments, a deobfuscation transformation may be performed. In addition to or in the alternative to a deobfuscation transformation, a difference may be generated between the file being examined and a known good file generating a difference result. The results of the deobfuscation transformation or the difference result may then be examined by the use of any or all of the above techniques.

At step 406, the systems described herein may perform a signature process in response to the received signature request. Performing a signature process may be done in a variety of ways. One exemplary way is shown in more detail in FIG. 5. In addition to the exemplary embodiment of FIG. 5, performing a signature process may include determining whether a signature request should be granted. This determination may be based on the one or more scan results generated in step 404. For example, if the context of the file or signature request indicates that the client device from which the signature request was received does not match the client device from which the requesting user normally generates a signature request, the signature process may determine that the signature request should be rejected. In another example, a signature request may be received from London, England, while all previous signature requests have been received from a client system located in Mountain View, Calif. As a result of the mismatch, the signature process may determine that the signature request should be rejected.

Figure 5:
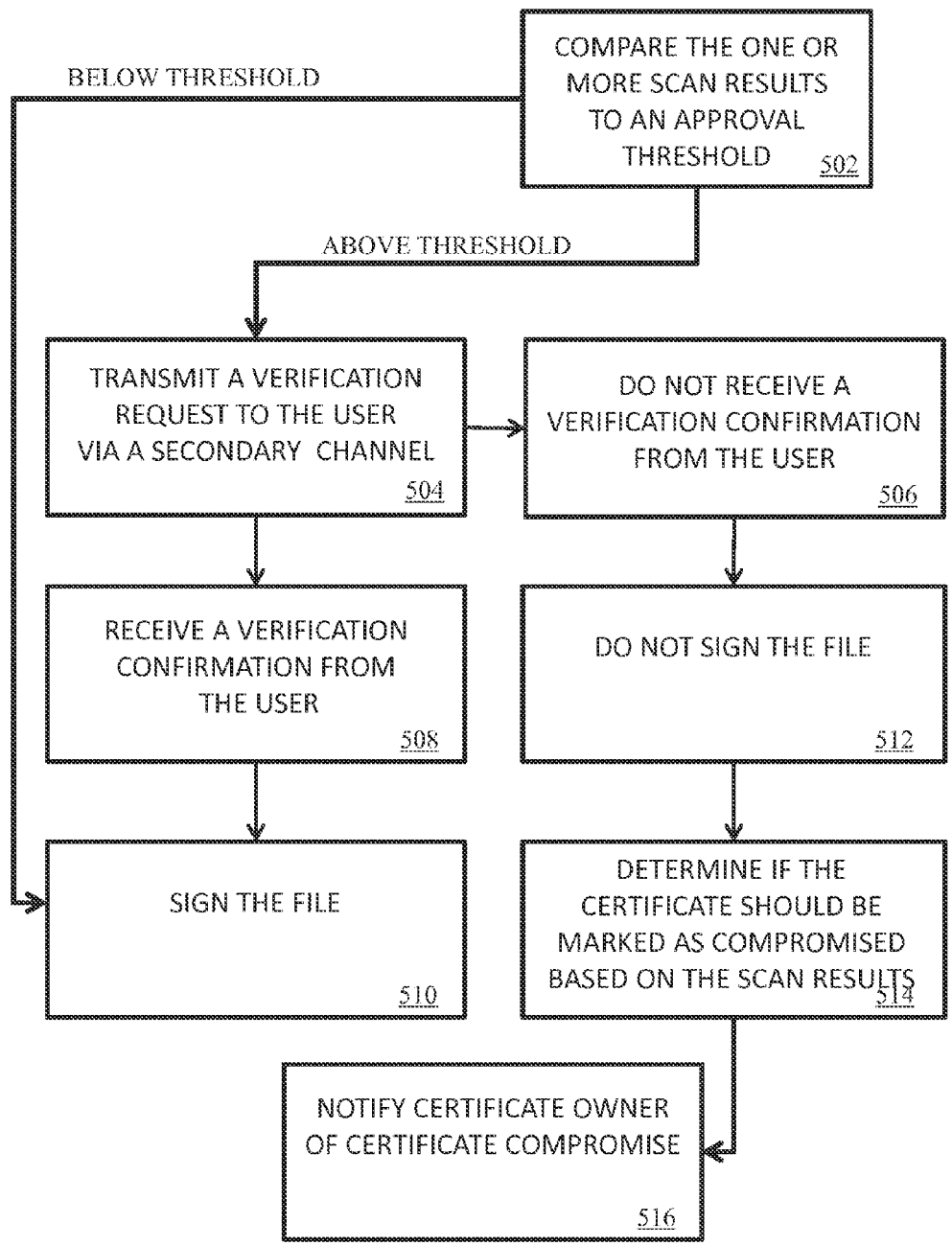
FIG. 5 is a flowchart illustrating the operation of a method for performing a signing process in accordance with an embodiment of the present disclosure.

When a signature request is rejected, it may be denied outright, or it may require additional contact with the user to provide verification in order to proceed with a signature, such as the verification process that is shown in more detail in part of FIG. 5. If the signature process determines that a signature request should be granted, then the signature process may proceed to sign the file for which the signature was requested. If the signature process determines that the request should be denied outright, or if the user does not provide verification of the signature request, then the signature process does not sign the file. In some embodiments, the signature process may mark the certificate which was requested to be used as compromised.

In addition, the signature process may trigger reactions at various times. For example, in certain embodiments the signature process may trigger an immediate verification process, as described above. In some embodiments, the signature process may also trigger a latent process such as adding a warning of potential compromise to the certificate's historical data. In other embodiments, the signature process may place the certificate into an enhanced information gathering mode where more information is acquired by the system the next time the certificate is requested to be used to sign a file.

At step 408, an indication of the one or more scan results is generated and transmitted to a reputation service system. Such a system may be, for example, the security server 102 of FIG. 1. The indication may include the one or more scan results, a statistical interpretation of the one or more scan results, a threshold-based interpretation of the one or more scan results, or a determination based on the scan results. For example, the indication may be the scan results themselves. In one embodiment, the indication may be an estimated probability the file is malicious or an estimated probability the file is not malicious. In another embodiment, the indication may be a category that describes a risk metric for the file. In another embodiment, the indication may be a determination that the file is malicious or that the file is not malicious. In addition, in some embodiments the indication may be a combination of one or more of the above, such as a determination the file is malicious combined with the one or more scan results. In addition to the indication of the one or more scan results, a file identifier that identifies the file may be transmitted to the reputation service in order to identify which file the indication is related to. Such a file identifier may include a filename, file metadata, a hash of the file, the time at which the file was signed, or the contents of the file. The transmitted indication and/or the file identifier may be utilized by the reputation service system to add a new level of trust for the file, or to replace, modify, or otherwise change an existing level of trust for the file.

As an example of one embodiment of the process shown in FIG. 4, a user using a client system 112a may transmit a signature request to a signing server 104. The signing server 104 receives the signature request, as shown in step 402. In this embodiment, the signature request includes a file to be signed prior to the public release of the file and access information providing access to a certificate to be used in signing the file. The signing server 104 then scans the signature request, as shown in step 404. In this embodiment, the signing server 104 examines the contents of a file contained in the signature request by emulating execution of the file and recording the results of execution as well as by performing a difference operation between the file and a known good previous version of the file and performing static string analysis on the difference result. The results of file execution and the results of the static string analysis are input into a function and the output of the function is a trust metric or level of trust in the file. The level of trust in the file comprises a scan result. The signing server 104 then performs a signature process on the file, as shown in step 406. In this embodiment, the signature process includes the signing server verifying the certificate requested for use in signing has not been compromised. The signature process also includes the signing server signing the file using the certificate requested for use. The signed file is then transmitted back to the client system 112a from which the request was received. In addition, an indication of the one or more scan results is transmitted to a reputation service system such as security server 102 in FIG. 1. In this embodiment, a file identifier is also transmitted to the reputation service system. The file identifier in this embodiment is a hash of the signed file.

As mentioned above, FIG. 5 depicts in detail certain embodiments of performing the signature process shown in step 406 of FIG. 4. In these embodiments, after a signature request is received from a user and the signature request and/or a file contained within the signature request is scanned to generate one or more scan results, the method shown in FIG. 5 is used to perform the signature process. The one or more scan results are then compared to an approval threshold, as shown in step 502. For example, a static string analysis may have detected 5 potentially malicious strings, while the threshold number of malicious strings may be 4. In this example, the results are above the approval threshold. In another example, an emulation environment run of the file may have determined that 7 accesses to memory ranges out of the program memory range have occurred, while the threshold number of such accesses may be 10. In this example, the results are below the threshold. Other comparisons may also be performed, such as taking the output of a function with the scan results as an input, where the output is an estimated trust metric, and comparing the estimated trust metric to an approval threshold for a trust metric, or comparing a geolocation to an expected geolocation and determining if the distance between the two exceeds some threshold. In some embodiments, other conditions might also trigger the verification process. For example, if the certificate which is to be used has been previously marked as potentially compromised, then a verification process may be triggered.

In these embodiments, if the comparison results in a determination that the scan results are below the approval threshold, the file may be signed immediately, as shown in step 510. However, if the scan results are above an approval threshold, then a verification procedure is triggered, as shown in FIG. 5. In step 504, a verification request is transmitted to the user. In one such embodiment, the verification request is transmitted via a secondary communications channel. A secondary communications channel is a channel other than the one by which the signature request is received. For example, if the signature request was received via a TCP/IP connection, a secondary channel may include e-mail, telephone communications, instant messaging, text messaging, postal mail, in-person meetings, or other alternate channels of communication. The verification request may request that the user verify that they made the signature request. The verification request may also notify a user of a potential certificate compromise. If a verification is received from the user, then the file may be signed, as shown in step 510.

If a verification is not received from the user (i.e., the user does not respond within an allotted time period, or the user affirmatively denies having made the request), as shown in step 506, then the file is not signed, as shown in step 512. In addition, a process for determining if the certificate should be marked as compromised based on the scan results may be triggered, as shown in step 514. In some embodiments, this process is also a comparison of scan results to an approval threshold, although the approval threshold may be a different threshold than that required for triggering the verification process. In other embodiments, this process may include heuristic analysis of the one or more scan results to determine a likelihood of compromise and a comparison of the likelihood of compromise to a compromise threshold. In the event the certificate is marked as compromised, either as a result of step 514 or as a result of a previous marking as compromised, the certificate owner may be notified, as shown in step 516. This notification may include a notification that the certificate has been compromised, a notification that a request was made to sign a file using a compromised certificate, or both.

At this point it should be noted that intelligently executing in accordance with the present disclosure as described above may involve the processing of input data and the generation of output data to some extent. This input data processing and output data generation may be implemented in hardware or software. For example, specific electronic components may be employed in a scanning module or similar or related circuitry for implementing the functions associated with scanning the signature request to produce one or more scan results in accordance with the present disclosure as described above. Alternatively, one or more processors operating in accordance with instructions may implement the functions associated with scanning the signature request to produce one or more scan results in accordance with the present disclosure as described above. The one or more processors may be hardware processors or hardware processors running a virtual machine. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for intelligently executing a digital signature, comprising the steps of:
    receiving a signature request from a user, wherein the signature request comprises a file;
    scanning the signature request to produce one or more scan results;
    performing a signature process on the file in response to receiving the signature request from the user; and
    communicating an indication of the one or more scan results to a reputation service server.

2. The method of claim 1, wherein the scan results comprise information related to the user.

3. The method of claim 2, wherein the information related to the user comprises one or more of: an IP address of a machine from which the signature request was made; a MAC address of the machine from which the signature request was made; an OS type of the machine from which the signature request was made; a timestamp of a time at which the signature request was made; an indication of one or more applications installed on the machine from which the signature request was made; a historical reputation of one or more other files previously signed by the user; a historical reputation of one or more other files previously signed by a certificate associated with the signature request; the number of certificates in a plurality of certificates associated with the user; and an indication of information related to the plurality of certificates associated with the user.

4. The method of claim 1, wherein the scan results comprise information related to the file.

5. The method of claim 1, wherein scanning the signature request comprises examining the contents of the file.

6. The method of claim 5, wherein examining the contents of the file comprises one or more of:
    emulating the execution of the file;
    performing a deobfuscation transformation on the file;
    performing a static string analysis of the file;
    performing a statistical analysis of one or more properties of the file;
    comparing the file and a previously signed file; and
    examining the contents of a difference between the file and a known good file.

7. The method of claim 1, wherein performing a signature process further comprises:
    contacting the user via a secondary communications channel;
    transmitting a signature verification request to the user;
    receiving a signature verification confirmation from the user; and
    signing the file after the user verifies the signature request.

8. The method of claim 1, wherein performing a signature process further comprises determining whether to sign the file based on the one or more scan results.

9. The method of claim 8, wherein the determination is based on a comparison of the one or more scan results to one or more approval thresholds.

10. The method of claim 1, wherein the indication of the one or more scan results comprises a file confidence metric.

11. The method of claim 1, wherein the indication of the one or more scan results comprises a determination that the file is not malicious.

12. A system for intelligently executing a digital signature comprising:
    one or more processors communicatively coupled to a network; wherein the one or more processors are configured to:
    receive a signature request from a user, wherein the signature request comprises a file;
    scan the signature request to produce one or more scan results;
    perform a signature process on the file in response to receiving the signature request from the user; and
    communicating an indication of the one or more scan results to a reputation service server.

13. The system of claim 12, wherein performing a signature process further comprises determining whether to sign the file based on the one or more scan results.

14. The system of claim 12, wherein the one or more processors are further configured to:
    contact the user via a secondary communications channel;
    transmit a signature verification request to the user;
    receive a signature verification confirmation from the user; and
    sign the file after the user verifies the signature request.

15. The system of claim 12, wherein performing a signature process further comprises:
    determining if a certificate associated with the signature request has been compromised; and
    rejecting the signature request if the certificate has been compromised.

16. The system of claim 15, wherein performing a signature process further comprises notifying an owner of the certificate that the certificate has been compromised.

17. At least one non-transitory processor readable storage medium storing a computer program of instructions configured to be readable by at least one processor for instructing the at least one processor to execute a computer process for performing the steps of:
    receiving a signature request from a user, wherein the signature request comprises a file;
    scanning the signature request to produce one or more scan results;
    performing a signature process on the file in response to receiving the signature request from the user; and
    providing an indication of the one or more scan results to a reputation service server.

18. The non-transitory processor readable storage medium of claim 17, wherein the scan results comprise information related to the file.

19. The non-transitory processor readable storage medium of claim 17, wherein performing a signature process further comprises:
- contacting the user via a secondary communications channel;
- transmitting a signature verification request to the user;
- receiving a signature verification confirmation from the user; and
- signing the file after the user verifies the signature request.

20. The non-transitory processor readable storage medium of claim 17, wherein performing a signature process further comprises determining whether to sign the file based on the one or more scan results.

* * * * *